United States Patent [19]

Moderi et al.

[11] Patent Number: 5,510,979
[45] Date of Patent: Apr. 23, 1996

[54] DATA PROCESSING SYSTEM AND METHOD FOR RETAIL STORES

[75] Inventors: Martin J. Moderi, Glen Ellyn, Ill.; Shigeharu Matsumoto, Tokyo, Japan; Paul M. Bouzide, Chicago; Yung-Chun Tsau, Oak Brook, both of Ill.; Inge B. Kristiansen, Pasadena, Calif.; Patrick F. Castor, Naperville, Ill.; John W. Nelson, Chicago, Ill.; Roger W. Carlson, Schamburg, Ill.

[73] Assignee: Restaurant Technology, Inc., Oak Brook, Ill.

[21] Appl. No.: 402,809

[22] Filed: Mar. 13, 1995

Related U.S. Application Data

[63] Continuation of Ser. No. 737,749, Jul. 30, 1991, abandoned.

[51] Int. Cl.$^6$ .................................................... G07G 1/12
[52] U.S. Cl. ............................ 364/405; 364/406; 235/377
[58] Field of Search ................................... 364/405, 406; 235/376, 377, 382; 341/23; 395/153, 161

[56] References Cited

U.S. PATENT DOCUMENTS

| | | | |
|---|---|---|---|
| 4,323,771 | 4/1982 | Chauker, Jr. et al. | 235/375 |
| 4,675,515 | 6/1987 | Lucero | 235/381 |
| 5,128,862 | 7/1992 | Mueller | 364/405 |
| 5,235,509 | 8/1993 | Mueller et al. | 364/405 |

OTHER PUBLICATIONS

Compose (ver. 2.0) Software Program, Compose Inc., Virginia Beach, Va., Jan. 1988.
"Touch Screen Interactive Restaurant POS System", (description of Dataranger Software program) article from Dialog File: PTS New Products Announcements/Plus, Apr. 28, 1986.

*Primary Examiner*—F. L. Evans
*Attorney, Agent, or Firm*—Jenner & Block

[57] ABSTRACT

A computer system for entering, processing and recording sales of items is provided, which is especially suitable for use in retail sales, particularly quick service restaurants. The system includes a plurality of programmable POS registers for entering and tabulating customer orders, an off-line processor for programming the programmable POS registers, shared memory for recording data entered and tabulated by the programmable POS registers, and a communication structure for networking a plurality of programmable POS registers, the off-line processor and the shared memory. In one embodiment, the system includes an access control system for enabling access to the POS registers, the off-line processor or the shared memory if operation of those are authorized. In another embodiment, each POS register includes a programmable display for displaying a hierarchial menu of a plurality of keys, each of the keys being visually associated with a label of salable items or categories of salable items, and a touch sensitive apparatus for detecting when one of the keys has been touched by a human operator. The programmable display is responsive to the touch-sensitive apparatus so that a human operator can enter a particular salable item into the programmable display by touching the key which is visually associated with the label corresponding to the particular salable item or category in which the particular salable item is included.

19 Claims, 9 Drawing Sheets

Fig. 2
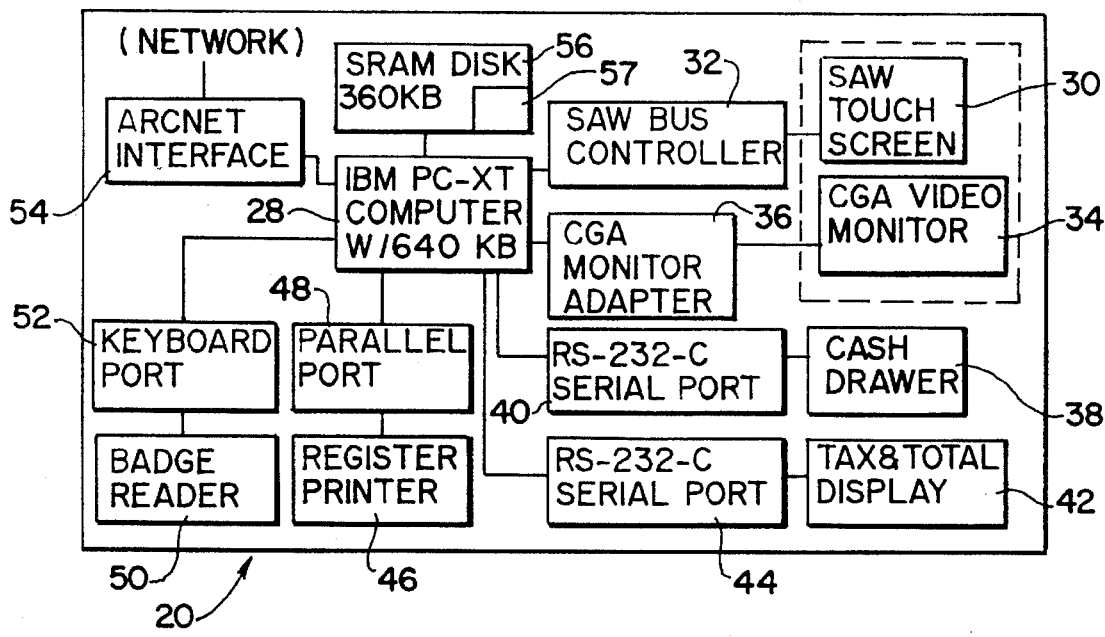
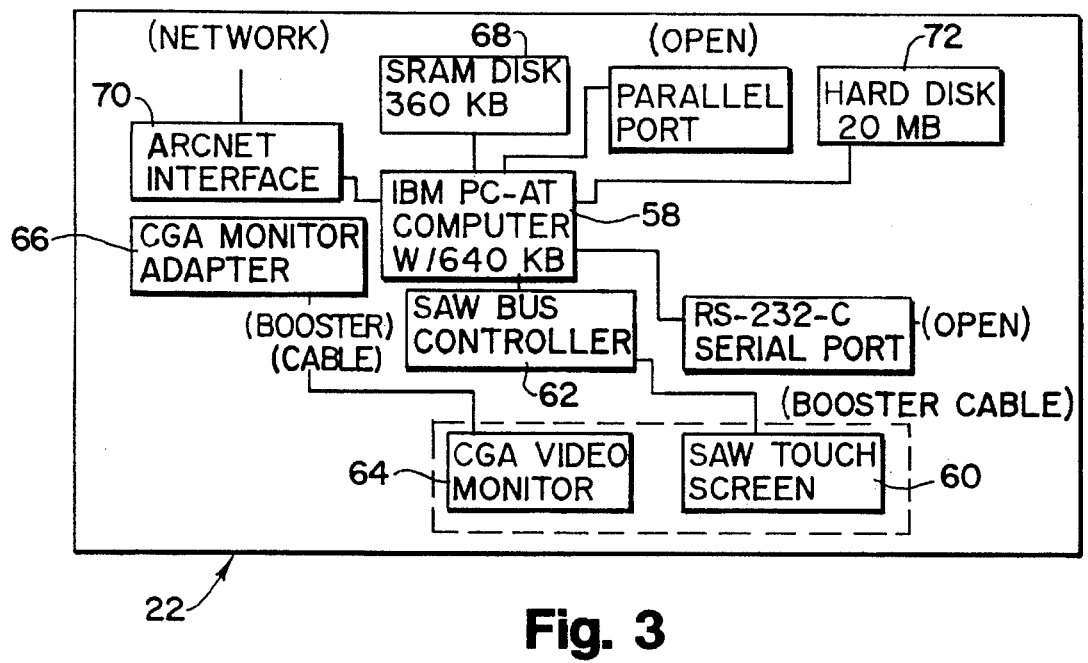
Fig. 3

Fig. 4
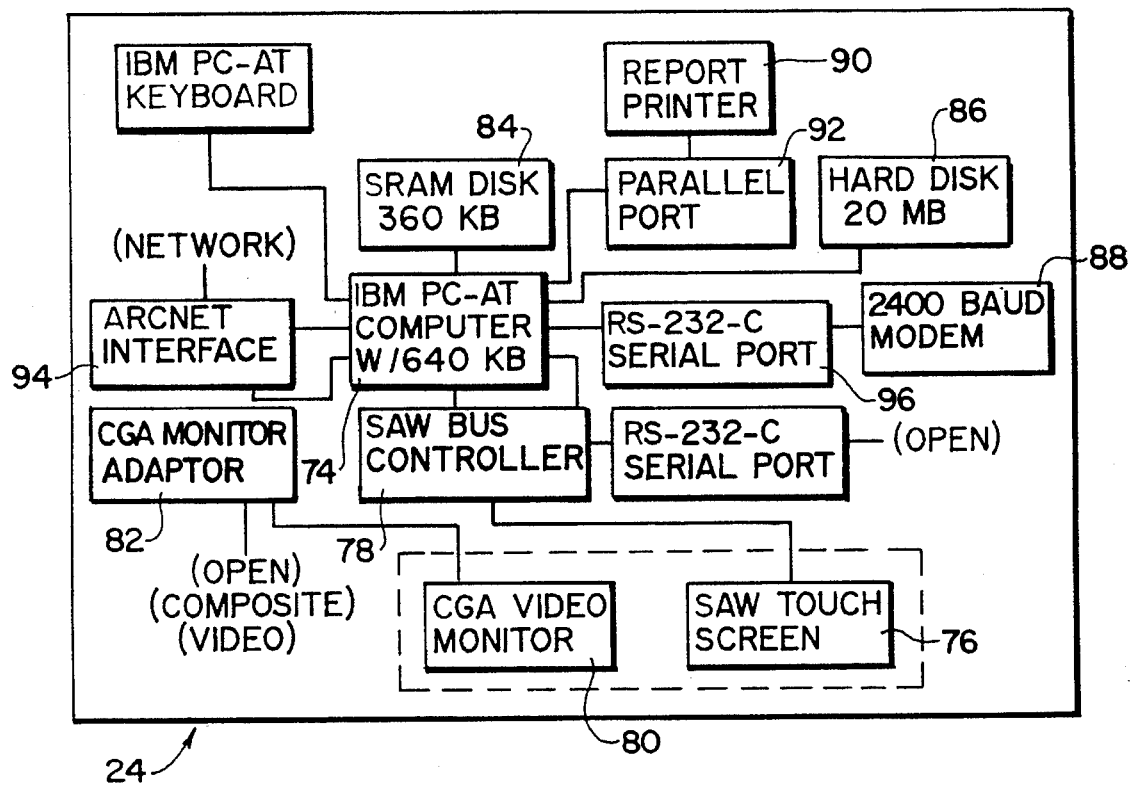
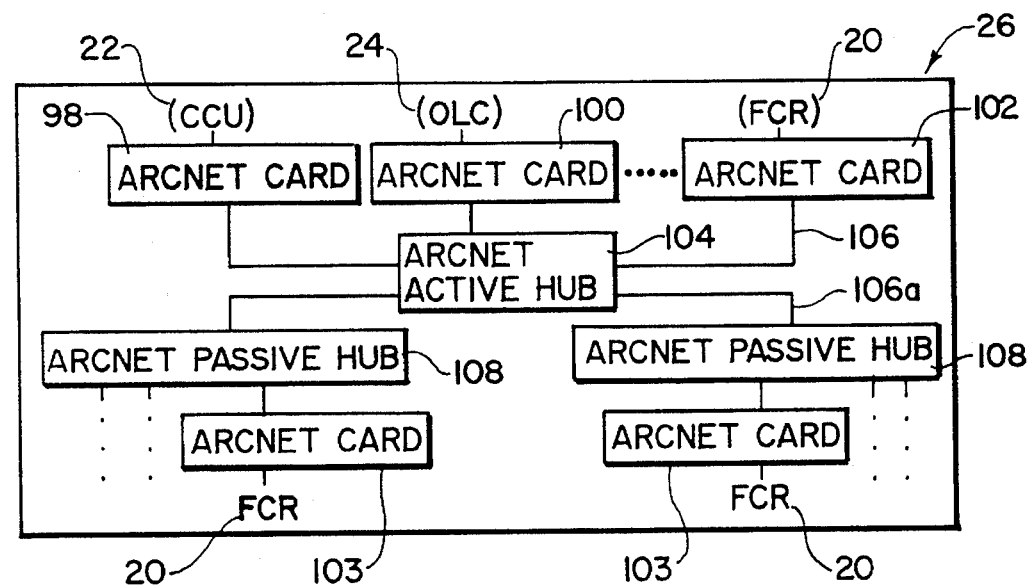
Fig. 5

DATA PROCESSING SYSTEM AND METHOD FOR RETAIL STORES

This application is a continuation of application Ser. No. 07/737,749, filed Jul. 30, 1991, now abandoned.

FIELD OF THE INVENTION

This invention relates to data processing, and more particularly, to data processing which takes place in retail stores.

BACKGROUND OF THE INVENTION

Retail stores by definition are in the business of selling inventory to individual customers, typically in a large number of small transactions. The point at which these transactions take place is known as the point of sale (sometimes referred to as the "POS"). Traditionally, retail stores have used cash registers or other calculating apparatus to compute the total cost of a customer's purchase and to provide some means of tracking total cash receipts.

In many retail environments, the point of purchase also serves as a point of order entry. For example, at a restaurant, most typically a quick service restaurant, a customer may order and pay for food at the same physical location, in which case the order may be entered into a cash register or similar device, which would then compute and record the customer's total purchase price.

At the time an order is entered, it is helpful to record not only the price of the ordered item (for totaling purposes), but also the description and quantity of the item. This additional information is useful for accounting and inventory purposes, and to conveniently provide store personnel with sufficient data to fill the order.

To this end, computer-based cash registers (often referred to as "point-of-sale registers", or "POS registers") have been developed which contain buttons or keys representing each of the various items offered for sale. In this manner, the operator, upon hearing a customer order a specific item, need only push the button or key corresponding to that item, thereby recording not only the price for totaling purposes, but also which specific item has been ordered.

The primary difficulty with such POS systems is that as the number of items offered for sale increases, so must the number of buttons or keys. This in turn increases the cost and complexity of the system. Further, when the store changes its offerings, which can frequently occur, it must make corresponding changes to each of its POS register keyboards.

Such systems also pose security risks to the extent that data and computer programs used to operate the system are readily accessible to store personnel operating the POS registers. Such systems also often require specialized equipment which is not only expensive but also difficult to expand or reconfigure. Such systems also have very limited ability to review and edit transactions which have occurred in the past.

SUMMARY OF THE INVENTION

The present invention addresses the deficiencies of the prior art by providing a retail computer system with centralized storage of data and application programs, which preserves the integrity and security of programs and data while maintaining processor performance even under extreme transaction loads. While the present invention is essentially concerned with point-of-sale transactions, its modular construction and employment of standardized general purpose computers enable its functions to be easily expanded to cover administrative, accounting and external interfaces.

In accordance with the present invention, a computer system for entering, processing and recording sales of items which is especially suitable for retail sales is provided. The system includes a plurality of physically separated programmable POS registers for entering and tabulating customer orders, an off-line processor at a location remote from the plurality of programmable POS registers for programming the programmable POS registers, shared memory at a location remote from the plurality of programmable POS registers for recording data entered and tabulated by the programmable POS registers, and a communications structure for networking the plurality of programmable POS registers, the off-line processor and the shared memory. For example, within a particular store, a plurality of POS registers can be provided at various locations within the store, such as one at each of various order stations or checkout locations, where customers place orders and/or pay for the goods or services that have been ordered. The shared memory and off-line processor is at a location remote from the POS registers, such as, for example, in a manager's office or at a location generally inaccessible to the employees that staff the order taking stations or checkout locations.

In accordance with another embodiment of the invention, the computer system further includes an access control system for enabling access to the POS registers, the off-line processor or the shared memory if operation of those are authorized. The access control system includes a plurality of badges, each affixed with a magnetic strip having a unique number electronically encoded therein and each assigned to a particular operator. A plurality of conventional badge readers are provided that are electronically connected to the communications system for reading the unique numbers on the badges. Further, a password entry system is provided for accepting a password from one of the operators who has placed his or her badge in the badge reader. A table residing on the shared memory records these unique numbers and relates each to a predetermined password and privilege level. A copy of this table is periodically placed onto the off-line processor, where it may be edited. A button, switch or touch key on each of POS registers, off-line processor and shared memory enables a human operator to designate a particular component that he or she desires to operate. An access enabling routine is provided for determining whether the number encoded on any one of the badges which has been passed through the badge reader is contained in the table. If the encoded number is contained in the table, the access enabling routine determines whether the password entered by the operator matches the predetermined password related by the table to the unique number. If the passwords match, the operator is granted access to the designated component. Finally, a function enabling routine is provided for enabling access to a desired function performed by the designated one of the plurality of POS registers, the off-line processor or the shared memory if the privilege level related by the table to the operator's unique number is equal to or greater than the desired function's predetermined privilege level.

In accordance with another embodiment, the access control system can include a routine for recording the unique number and the time at which the badge upon which the unique number is electronically encoded was read by the badge reader, whereby the payroll routine can record the time which operators arrive and depart work as a function of the time when the badge is read by the badge reader.

In accordance with still another embodiment of the invention, a computer system for entering, processing and recording sales of items is provided. The computer system includes a plurality of physically separated programmable POS registers that include a display for displaying a plurality of keys which may be visually associated with labels that correspond to at least one salable item or category having a plurality of salable items, and a touch-sensitive apparatus for detecting when one of the keys has been touched by a human operator, so that a human operator may enter a particular salable item by touching the key which is visually associated with the label corresponding to that particular item. The system further includes an off-line processor, a shared memory and a communications network.

The off-line processor is at a location remote from the plurality of programmable POS registers, for programming the programmable POS registers to assign the keys to salable items or categories having a plurality of salable items.

The shared memory is at a location remote from the plurality of programmable POS registers, for recording customer orders entered and tabulated by the programmable POS registers and for storing programs for the programmable POS registers and can be in the same location as the off-line processor.

The communications system networks the plurality of programmable POS registers, the off-line processor and the shared memory.

In accordance with another aspect of the present invention, the computer system for entering, processing, and recording sales of items includes a plurality of physically separated programmable POS registers, each POS register including a programmable display for displaying a hierarchial menu of a plurality of keys, each of the keys being visually associated with a label that corresponds to a category of salable items, and a touch-sensitive apparatus for detecting when one of the keys has been touched by a human operator. The programmable display is responsive to the touch-sensitive apparatus so that a human operator can enter a particular salable item into the programmable display by touching, such as with a finger or a stylus, for example, the key which is visually associated with the label corresponding to the particular category in which the particular salable item is included, whereupon the programmable display will display that one of a plurality of overlays which contains that one of the keys which is visually associated with that one of the labels corresponding to the particular item.

In accordance with another aspect of the invention, the method for networking a microcomputer to a physically separated shared memory device to enable the microcomputer to operate as a point-of-sale register and to ensure the integrity of sales data generated by the microcomputer is provided. The method includes connecting the microcomputer and the shared memory device with a computer network. An original copy of transaction data generated by the microcomputer is stored on a memory device connected to the microcomputer. A duplicate copy of the transaction data is stored on a memory device connected to the shared memory device. Thereafter, a sequentially generated transaction number is associated with each successive set of the original and duplicate copies of the transaction data, whereby the most recently generated copies have the highest transaction number. The transaction numbers associated with the most recently generated of the original and duplicate copies of the transaction data are compared to determine if the transaction numbers are identical. The presence of identical transaction numbers on the original and duplicate copies of the transaction data ensures that the microcomputer and the shared memory device have correct and current transaction data.

In accordance with another aspect of the invention, a method for networking a microcomputer to a physically separated shared memory device to enable the microcomputer to operate as a POS register and to ensure the integrity of sales data generated by the microcomputer is provided and includes the following steps:

(a) storing programs and data necessary to enable the microcomputer to function as a POS register on a shared memory device that is physically separated from the microcomputer;

(b) electronically connecting the microcomputer with the shared memory device;

(c) creating data structures in the microcomputer's memory for storing cumulatively tabulated sales data, the data structures each having of a plurality of records containing the tabulated data and a file header containing a transaction number;

(d) creating backup data structures in the shared memory which are duplicative of the data structures in the microcomputer's memory, so that for each data structure in the microcomputer's memory, there is a corresponding backup data structure in the shared memory;

(e) entering sales from a specific customer transaction into the microcomputer;

(f) tabulating sales data for each customer transaction entered into the microcomputer;

(g) generating a transaction number which is greater than the previous transaction number;

(h) placing the transaction number in the file header of each data structure;

(i) updating the data structures with the tabulated data;

(j) determining if steps (g) through (i) have been successfully completed, and aborting the operation of the microprocessor where steps (g) through (i) have not been successfully completed;

(k) updating each of the backup data structures with tabulated data and transaction numbers contained in the corresponding data structures on the microcomputer;

(l) determining if step (k) was successfully completed, and if step (k) was successfully completed then skipping to step (p);

(m) determining if the failure of step (k) was due to a failure of the networking means, and aborting the operation of the shared memory if failure of step (k) was due to a reason other than a failure of the networking means;

(n) waiting until the networking means has been made operational;

(o) examining each data structure and the backup data structure to determine whether any of the data structures has a higher transaction number than its corresponding backup data structure; and (p) updating the contents of the backup data with the contents of the corresponding data structure if the data structure contains a higher transaction number than the corresponding backup data structure.

This method may further include the steps of, after step (d):

(1) examining each data structure and backup data structure to determine whether any backup data structure has a higher transaction number than any corresponding data structure;

(2) updating the contents of the data structure with the contents of the backup data structure if the backup data structure contains a higher transaction number than the data structure; and (3) updating the contents of the corresponding backup data structure if the data structure contains a higher transaction number than the backup data structure.

In operation, normally steps (e) through (p) are repeated for each successive customer transaction.

In the preferred embodiment, the invention is comprised of microcomputers compatible with the IBM® PC/XT/AT standard, including microcomputers which function as POS registers. For data security and integrity, these POS registers have no diskette drives or removable storage devices. Through a local area network, they access necessary programs and data on other microcomputers. In lieu of a traditional keyboard, they provide touch-sensitive keys which are displayed on a video monitor. Because these keys are generated by microcomputer, they can be easily reconfigured in any arbitrary or desired fashion.

The present invention can also make use of remote virtual disk ("RVDISK") technology. RVDISK technology provides the capability for a microcomputer to operate without a disk drive. Such a microcomputer is referred to as a "diskless microcomputer." Programs and data necessary to operate a group of diskless microcomputers are stored on one central computer's disk drive and accessed by the diskless microcomputers using RVDISK technology.

Using diskless microcomputers as POS registers increases the reliability and lowers costs because each POS register does not require a disk drive, tape drive or removable media storage device. In addition, the absence of a disk drive or other removable mass storage device prevents operators of the POS registers from loading, copying or modifying programs and data resident on the POS registers. Finally, centralized storage of programs and data results in easier upgrades and ensures that all POS registers are using the same software.

In accordance with one aspect of the invention, a POS system is provided which is comprised of standard, interchangeable hardware components which can be easily and inexpensively reconfigured or expanded.

In accordance with another aspect of the invention, a POS system is provided which uses programmable screen-generated keys which may be arbitrarily created and assigned, and which may be presented to an operator by means of a layered menu system.

In accordance with yet another aspect of the invention, a distributed processing POS system is provided which maintains centralized control over data and program files so as to ensure that each POS register is operating with the correct version of programs and data and to allow easy modification of such programs and data.

In accordance with yet another aspect of the invention, a POS system is provided which preserves the integrity of each POS register's sales data.

In accordance with yet another aspect of the invention, a POS system is provided in which access to programs and data is controlled, and each store employee can be given one of several different levels of privilege to access such programs and data.

In accordance with yet another aspect of the invention, a POS system is provided which can track the amount of time worked by each store employee.

Finally, in accordance with another aspect of the invention, a POS system is provided which allows store personnel to review previous POS transactions.

BRIEF DESCRIPTION OF THE DRAWINGS

FIG. 2 is a block diagram of a POS register (also referred to herein as "Front Counter Register" or "FCR") shown in FIG. 1;

FIG. 3 is a block diagram of the communications controller unit shown in FIG. 1;

FIG. 4 is a block diagram of the off-line computer shown in FIG. 1;

FIG. 5 is a block diagram of the in-line communication network shown in FIG. 1;

DETAILED DESCRIPTION OF THE INVENTION

1. Hardware Configuration

Figure 1:
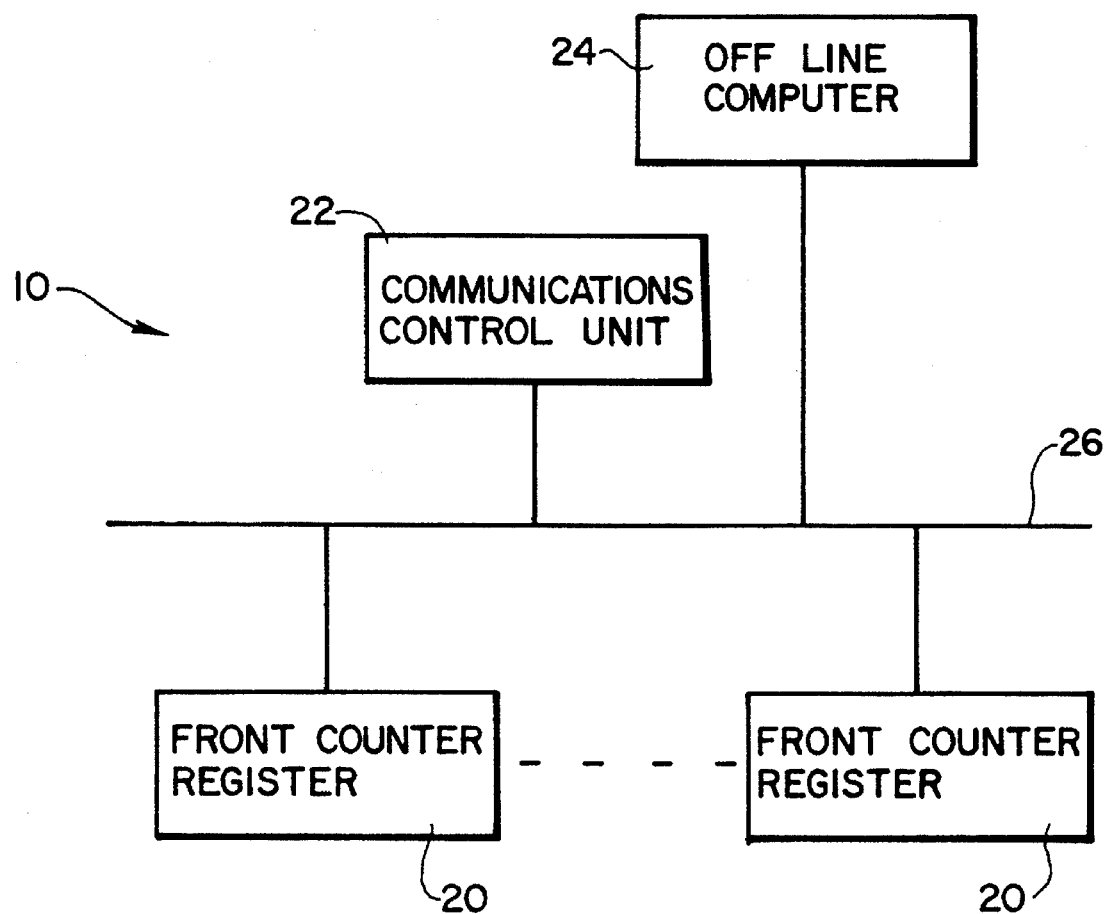
FIG. 1 is a block diagram of the hardware components of a computer system for retail stores in accordance with the invention.

A hardware configuration for an integrated computer system 10 (the "Retail System") for retail sales is shown in FIG. 1. Such a system is comprised of a plurality of programmable POS registers 20 (also referred to herein as a "front counter register" or "FCR"), a shared memory unit 22 (also referred to herein as a "communications controller unit" or "CCU") and an off-line computer 24 (an "OLC"). These components are electronically interconnected by means of an in-line communications network 26 (an "ILC"). Any desired number of FCRs 20 can be utilized in accordance with the invention. For example, a typical quick service restaurant may have a number of FCRs 20 in the range of from two to ten or more.

FCRs 20 are located at the point of purchase, and are used by store personnel for order input, order item editing, totals computation and amount tendering. Programs and data for operating the FCRs reside on CCU 22, which can be located anywhere in the store. OLC 24 may be operated by store management personnel to generate reports, edit data residing on CCU 22, and perform other administrative tasks. Generally, OLC 24 is desirably located in a manager's office or at another location physically separated from FCRs 20 and preferably generally inaccessible to the personnel that normally operate FCRs 20. In one embodiment of the invention, ILC 26 is a local area network based on the ARCNET standard which enables the foregoing components to communicate electronically.

FIG. 2 is a block diagram which illustrates FCRs 20 in greater detail. Each FCR 20 is comprised of an FCR microcomputer 28, a touch-sensitive screen 30 connected to FCR microcomputer 28 by touch-sensitive screen interface 32, a video monitor 34 connected to FCR microcomputer 28 by monitor adapter 36, a cash drawer 38 connected to FCR microcomputer 28 by serial port 40 (preferably, an industry standard RS-232-C), a tax and total display 42 connected to the FCR microcomputer 28 by RS-232-C serial port 44, a printer 46 connected to FCR microcomputer 28 by parallel port 48, a static random access memory unit 56 ("SRAM"), preferably of at least 360 kilobytes, located inside FCR microcomputer 28, a reserve power unit 57 electrically connected to SRAM 56, a network interface unit 54 also located inside FCR microcomputer 28, a badge reader 50 connected to FCR microcomputer 28 by keyboard port 52, and a register printer 46 connected to FCR microcomputer 28 by parallel port 48.

In a preferred embodiment, the foregoing FCR components are industry standard IBM PC-XT®/IBM PC-AT® compatible components that are widely known and marketed. Other components are also available, and the present invention embraces all such alternatives. FCR microcomputer 28 can be an IBM PC-XT® computer with at least 640 kilobytes of main memory. Video monitor 34 can be a video monitor which adheres to CGA, VGA or other industry standards. Tax and total display 42 can be a liquid crystal display ("LCD") or similar display. In the preferred embodiment, tax and total display 42 is an optional feature which may be omitted. SRAM 56 is a non-volatile storage unit which is accessible by FCR microcomputer 28 in the same manner as a disk drive. In the preferred embodiment, the SRAM is commercially available chip-based memory which retains information during times when the FCR is turned off. However, other non-volatile memory can be used, such as a hard disk drive. Reserve power unit 57 can be a battery. Badge reader 50 is a device which reads data encoded on a strip of magnetic tape which is affixed to the back of a badge or card. Such devices are widely known. Network interface unit 54 can be an ARCNET® network controller card which may be plugged into standard slots found on FCR microcomputer 28. It electronically connects FCR 20 to ILC 26. Touch-sensitive screen 30 can be a surface acoustic wave ("SAW") touch-sensitive screen, such as the Intellitouch™ Model E-264 available from Elographics, Inc. However, touch-sensitive screens based on other technologies such as capacitive contacts, resistive membrane overlays and infrared sensors could also be used. Touch-sensitive screen 30 may also incorporate (not shown) a liquid impermeable seal system for peripheral portions of touch-sensitive screen 30 for preventing liquid spills on the surface of touch-sensitive screen 30 from contacting the electrical components of the touch-sensitive screen. Such a seal is the subject of U.S. Pat. No. 5,332,238, issued Jul. 26, 1994 and entitled Surface Acoustic Wave Touchscreen Sealing System, the disclosure of which is hereby incorporated by reference. Touch-sensitive screen interface 32 can be a bus controller or other serial or parallel I/O interface. Cash drawer 38 signals FCR microcomputer 28 via serial port 40 when cash drawer 38 is open.

FIG. 3 is a block diagram which illustrates CCU 22 in greater detail. CCU 22 is comprised of a CCU microcomputer 58 (preferably an IBM PC-AT® with at least 640 kilobytes of main memory), a touch-sensitive screen 60 connected to CCU microcomputer 58 by touch-sensitive screen interface 62 (preferably, a bus controller), a video monitor 64 connected to CCU microcomputer 58 by monitor adapter 66, SRAM 68, preferably of at least 360 kilobytes located inside the CCU microcomputer 58, a network interface unit 70 (preferably, an ARCNET® network controller card) also located inside CCU microcomputer 58, and a CCU mass storage device (preferably a twenty-megabyte disk drive) 72 also located inside CCU microcomputer 58. In the preferred embodiment, the foregoing CCU components are industry standard IBM PC-XT®/IBM PC-AT® compatible components that are widely known and marketed. Numerous alternative computers and the hardware suitable for use in accordance with the invention are known to those skilled in the art and are contemplated for use in accordance with the invention.

FIG. 4 is a block diagram which illustrates OLC 24 in greater detail. OLC 24 is comprised of a OLC microcomputer 74, a touch-sensitive screen 76 connected to OLC microcomputer 74 by touch-sensitive screen interface 78, a video monitor 80 connected to OLC microcomputer 74 by monitor adopter 82, SRAM 84 of at least 360 kilobytes located inside OLC microcomputer 74, an external communication unit 88 connected to OLC microcomputer 74 by an RS-232-C serial port 96, an OLC mass storage device 86 located inside OLC microcomputer 74, a report printer 90 connected to OLC microcomputer 74 by parallel port 92, and a network interface unit 94 located inside OLC microcomputer 74.

In the preferred embodiment, the foregoing OLC components are industry standard IBM PC-XT®/PC-AT® compatible components that are widely marketed. Other components are also available and the present invention embraces all such alternatives. OLC microcomputer 74 can be an IBM PC-AT® computer with at least 640 kilobytes of main memory. Video monitor 80 can be a video monitor such as one which adheres to CGA, VGA or other industry standards. OLC mass storage device 86 can be a twenty-megabyte hard disk drive. SRAM 84 is a non-volatile storage unit which is accessible by OLC microcomputer 74 in the same manner as a disk drive. In the preferred embodiment, SRAM 84 is a commercially available chip-based memory which retains information during times when the OLC is turned off. However, other non-volatile memory can be used, such as a hard disk drive. External communication unit 88 can be a modem such as a 2400 baud modem. Other suitable modems are known to those skilled in the art and can be used. Touch-sensitive screen 76 can be a SAW touch-sensitive screen, such as the Intellitouch™ Model E-264 available from Elographics, Inc. However, touch sensitive screens based on other technologies such as capacitive contacts, resistive membrane overlays and infrared sensors could also be used. Touch-sensitive screen interface 78 can be a bus controller or other serial or parallel interface. The network interface unit 94 can be an ARCNET® network controller card.

FIG. 5 is a block diagram of ILC 26. In the preferred embodiment, ILC 26 is a local area network which adheres to the ARCNET® standard. Other types of local area networks are known to those skilled in the art and can be used. ILC 26 is comprised of at least three network interface units (preferably, ARCNET® network controller cards) 98, 100 and 102 connected to CCU 22, OLC 24 and FCR 20, respectively. These network interface units are also depicted herein as network interface units 70, 94 and 54, respectively. Additional network interface units 103 are provided for each additional FCR 20. Network interface units 98, 100 and 102 are connected to each other by a coaxial cable 106 to form active hub 104, and network interface units 103 are connected to each other by coaxial cable 106a to form passive hubs 108. ILC 26 enables FCR 20, CCU 22 and OLC 24 to communicate, and to cross-access attached devices such as badge reader 50 and printers 46 and 90.

A network and accompanying software which is especially suitable for the present invention is disclosed in U.S. patent application Ser. No. 07/738,084, (Attorney's Docket No. 25570-10286), filed concurrently with this application and entitled *Distributed Data Processing System and Method Utilizing Peripheral Device Polling And Layered Communicating Software,* the disclosure of which is hereby incorporated by reference. This distributed processing system is preferably employed as the communication infrastructure, upon which the present invention is constructed.

2. Data Entry and Key Position Assignment

Figure 6:
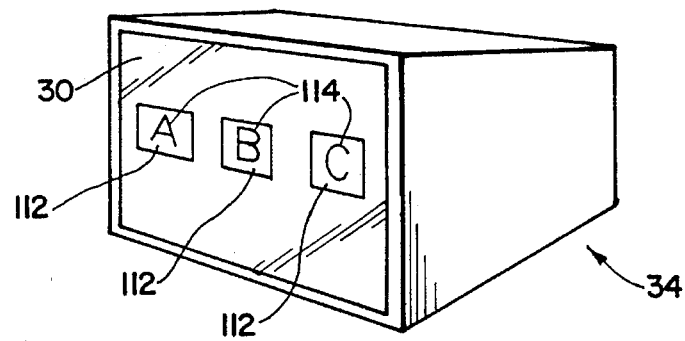
FIG. 6 is a perspective drawing of touch keys displayed onto the video monitor shown in FIGS. 2, 3 and 4.

In the preferred embodiment, each FCR 20 is used to input customer orders. Referring to FIG. 2, FCR microcomputer 28 computes the tax and total information for each order, displays tax and total information on tax and total display 42, and prints a receipt on register printer 46. Turning to FIG. 6, the operator enters data and otherwise controls FCR 20 by pressing one of touch keys 112. Touch keys 112 are simulated buttons which FCR microcomputer 28 has been programmed to display onto video monitor 34. Touch keys 112 may be visually associated with labels 114, each of which corresponds to a particular salable item or category of salable items. Video monitor 34 includes touch-sensitive screen 30. When the operator places his or her finger on the region of the touch screen 30 upon which a particular touch key 112 is displayed, touch-sensitive screen 30 sends a predetermined signal to FCR microcomputer 28 via bus controller 32, from which FCR microcomputer 28 can determine which particular touch key 112 the operator has touched. In the preferred embodiment, there is a touch key 112 corresponding to every salable item or category thereof and modifier or option thereto. As described below in greater detail, the software which enables FCR microcomputer 28 to perform the foregoing functions is resident on CCU 72, and is periodically loaded onto FCR microcomputer 28. In the preferred embodiment, this loading takes place when the system is initially turned on, typically in the morning of each business day.

Figure 7:
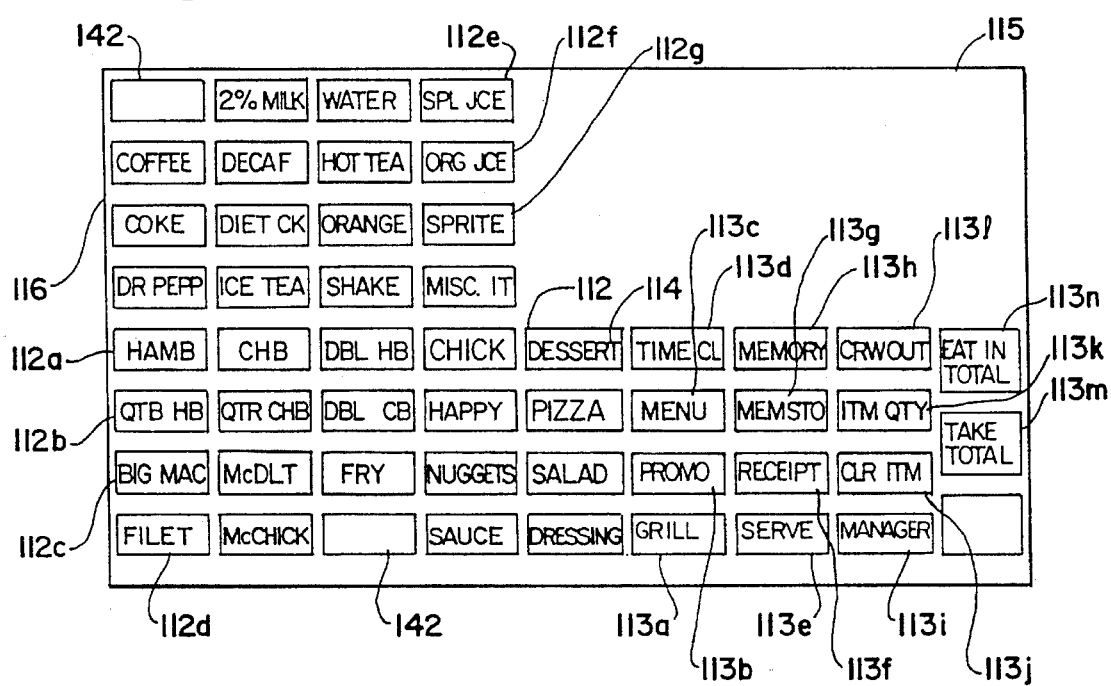
FIG. 7 is an illustration of the Ordertaking Display Screen generated by the POS register shown in FIG. 2.
Figure 8:
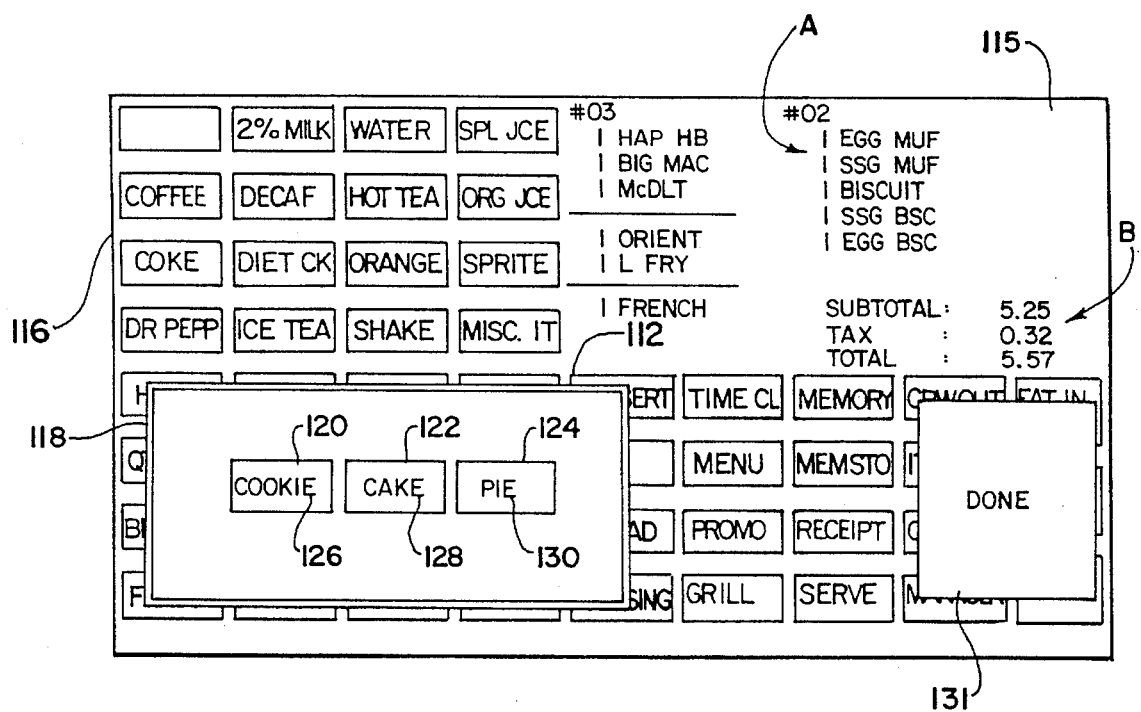
FIG. 8 is an illustration of the Desert Overlay generated by the POS register shown in FIG. 2.

FIG. 7 illustrates an ordertaking display screen 116 which FCR microcomputer 28 generates on video monitor 34 at the beginning of each customer transaction. Ordertaking display screen 116 displays touch keys 112 visually associated with labels 114 which correspond to categories of salable items. In FIG. 7 each rectangular area having printing contained therein is a touch key 112, although not all such touch keys are referenced by numeral 112 in FIG. 7, and several touch keys are referred to by numerals 112a–112g. The categories and items designated by the touch keys in the Figures are identified by labels 114, which correspond to the name of a category or item. For example, in FIG. 7 "2% Milk," "Water" and "Coffee" correspond to categories of foods differentiated by size, flavor or other quality. When the operator touches that one of touch keys 112 corresponding to a particular category, FCR microcomputer 28 displays an overlay 118 of additional touch keys visually associated with salable products within the designated category, as shown in FIG. 8.

For example, assume that the customer has ordered a dessert. The operator will touch that one of touch keys 112 visually associated with label 114 which indicates "DESSERT". Touch screen 30 senses that the touch key 112 which is associated with the "DESSERT" label has been touched, and sends a predetermined signal to FCR microcomputer 28. As shown in FIG. 8, FCR microcomputer 28 then displays an overlay 118 which presents additional touch buttons 120, 122 and 124 visually associated with labels 126, 128 and 130, respectively, identifying specific dessert products (in this case, "COOKIE", "CAKE" and "PIE"). At this point, the operator touches that one of touch buttons 120, 122 or 124 which corresponds to the dessert product which the customer has ordered. Touch screen 30 senses which touch button 120, 122 or 124 has been touched and sends the appropriate predetermined signal to FCR microprocessor 28, which can record the entry of the customer's order. If there are additional variations relating to a specific dessert product, FCR microcomputer 28 can display an additional overlay on top of overlay 118. In this manner, an arbitrary number of layers of overlay menus can be presented to the operator. If there are no additional variations relating to a specific desert product, the operator can touch key 131 labeled "DONE" whereupon the microcomputer ceases displaying overlay 118, revealing original ordertaking display screen 116.

Referring to FIG. 7, ordertaking display screen 116 can contain other keys 112 visually associated with other labels 114 which correspond to other categories of salable items or commands which instruct the FCR microcomputer 28 to perform certain functions. The ordertaking display screen can also contain order data display area 115, in which the FCR microcomputer 28 can display entered items, subtotal of entered items, tax and grand total for each order as indicated by arrows A and B, as shown in FIG. 8. In accordance with the present invention, the FCR microcomputer 28 can be programmed to display other data in order data display area 115, depending upon the particular retail environment in which the present invention is used. The exact configuration of keys and labels and the types of commands made available, necessarily depend on the particular retail environment in which the invention is practiced. For example, in the preferred embodiment keys 112a through 112d correspond to salable items. Keys 113a through 113n correspond to particular functions.

In the preferred embodiment, key 113a corresponds to the Grill command, which instructs the FCR microprocessor 28 to display an overlay similar to overlay 118, which presents additional keys corresponding to condiments and other modifiers pertaining to the salable products enterable by pressing one of keys 112a through 112d. Key 113b corresponds to the Promotion command, which instructs the FCR microcomputer 28 that the next entered saleable item is subject to special promotional pricing. Key 113c corresponds to the Menu command, which toggles the displayed menu to show breakfast items or lunch/dinner items. Key 113d corresponds to the Time Clock command which enables an operator to record the time of his or her arrival or departure from work, as discussed more fully below. Key 113e corresponds to the Serve command, which causes an order to be removed from the pending order queue. Key 113f corresponds to the Receipt command, which causes the FCR microcomputer 28 to print a receipt on register printer 46. Key 113g corresponds to the Memory Store command, which causes the presently entered order to be stored on the pending order queue. Key 113h corresponds to the Memory command, which instructs the FCR microcomputer 28 to display the elements of the pending order queue. Key 113i corresponds to the Manager Mode command, which grants access to privileged functions available only to managerial personnel. These functions depend on the specific retail environment in which the invention is practiced. A system for limiting access to these functions is provided and discussed below under Security. Key 113j corresponds to the Clear Item command, which clears the last entered item. Key 113k corresponds to the Item Quantity command. After 113k is pressed, the FCR microcomputer 28 displays a numeric keypad of touch keys (not shown), onto which the operator may enter a quantity. The next salable item which the operator selects will be associated with that quantity. The alternative means of entering multiple quantities of a particular item is to repeatedly press the touch key 112 corresponding to that particular item. Key 113*l* corresponds to the Crew Out (or "Log Off") command, discussed below in connection with Security. Keys 113*m* and 113*n* instruct the FCR microcomputer 28 to total salable items entered for a particular order. The operator presses key 113*m* when the order is to be consumed off-premises (or "carried out") and key 113*n* when the order is to be consumed on-premises. This bifurcation enables the Retail System 10 to track the percentage of orders which are carried out. Also, in some jurisdictions, the amount of tax charged to a particular sale depends on whether the order is carried out or eaten on premises.

Keys 112*e* through 112*g* correspond to categories of drinks, in this case special juice (shown on FIG. 7 as "SPL JCE"), orange juice (shown on FIG. 7 as ORG JCE) and Sprite®. If an operator were to touch one of keys 112*e*, 112*f* or 112*g* an overlay similar to overlay 118 would be displayed by FCR microprocessor 28, which would present additional keys corresponding to small, medium and large drink sizes.

The types of categories and the criteria which differentiate the items contained therein depend on the particular retail environment in which the invention is practiced. In the preferred embodiment, these criteria are flavor, size and type (i.e., type within a class or group). For example, a chocolate-flavored milk shake would be a salable item within the category of milk shakes. A large-size Coke® would be a salable item within the category of Cokes. A pie-type dessert would be a salable item within the category of desserts.

Figure 9:
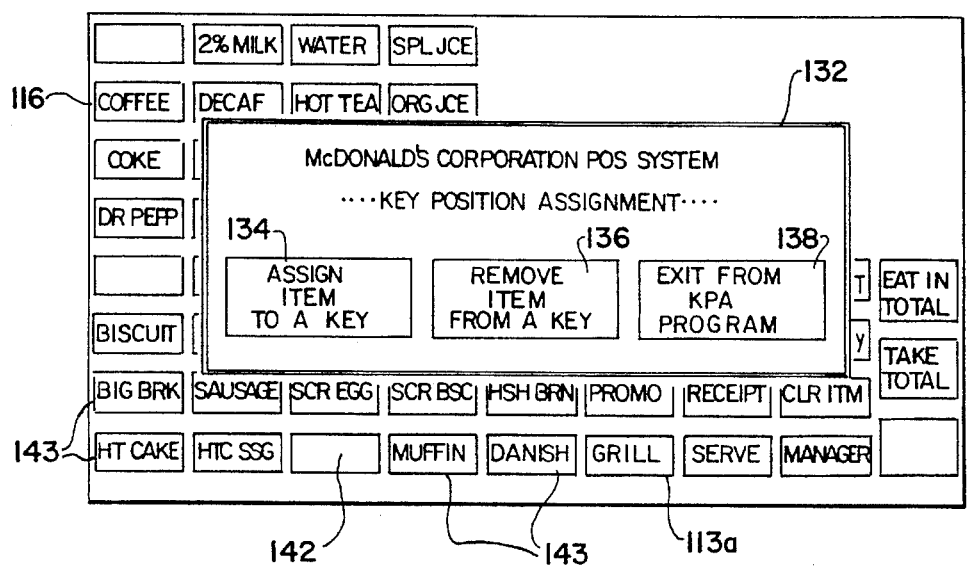
FIG. 9 is an illustration of the Key Position Assignment Control Overlay generated by the off-line computer shown in FIG. 4.

The operator of FCR 20 can activate touch keys but cannot assign specific categories or salable items to specific keys. Such assignments are made by a key position assignment program (the "KPA Program") which is stored on and executed by OLC 24. In the preferred embodiment, only managerial personnel would have physical access to OLC 24. When the KPA Program is executed, OLC microcomputer 74 displays an order taking menu screen 116 with a KPA control overlay 132, as illustrated in FIG. 9. KPA control overlay 132 presents the operator with three touch keys 134, 136 and 138, respectively associated with the Assign Item, Remove Item and Exit functions.

Figure 10:
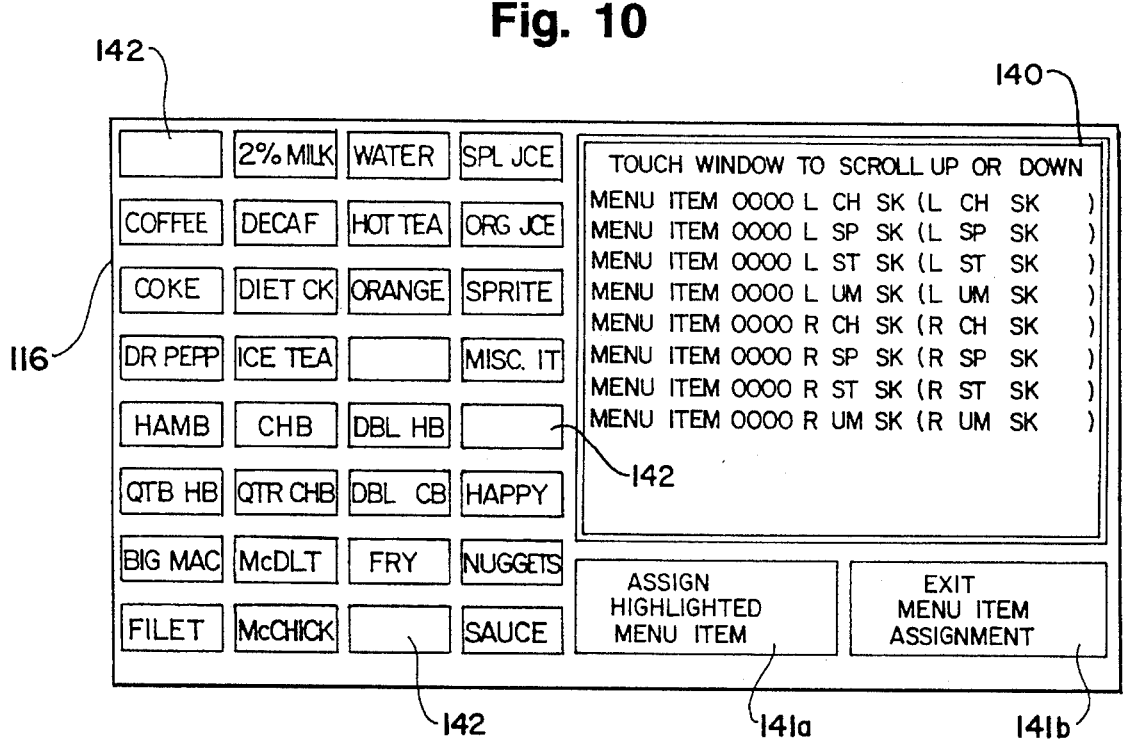
FIG. 10 is an illustration of the Item Assignment Selection Screen generated by the off-line computer shown in FIG. 4.

If the operator touches touch key 134 visually associated with the Assign Item function, OLC microcomputer 74 ceases to display the KPA control overlay and displays a list 140 of assignable salable items and categories of items, as indicated in FIG. 10. The operator may then assign one of the displayed assignable items or categories to an unassigned touch key 142. In the preferred embodiment, the operator selects the item to be assigned by touching the region of the list of assignable items where the desired item is displayed, which causes the item to be highlighted. The operator then touches key 141*a* which instructs OLC microcomputer 74 to assign the highlighted item or category. The operator may exit the Assign Item function by touching key 141*b*. This process can be repeated for other assignable items and categories, or for modifiers or options relating thereto.

In the preferred embodiment, the operator can also assign a key 142 to an overlay so that if the operator touches such key 142, the FCR microcomputer 28 will display an overlay, such as overlay 118 described above. In accordance with the invention, the operator may designate the orientation (horizontal or vertical) and number of keys contained in the overlay. The operator can then assign each key in the overlay to an assignable item or category in the manner described above. This process can be repeated to create a hierarchial menu of overlays, wherein each successive overlay presents keys corresponding to progressively more detailed attributes of salable items, such as size and flavor.

If the operator touches touch key 136 visually associated with the Remove Item function, OLC microcomputer 74 will cease displaying KPA control overlay 132, and permit the operator to select one of any presently assigned touch keys 143. That one of touch keys 143 that is selected will no longer be associated with a particular menu item. Touch keys 142 are examples of unassigned touch keys.

Figure 11:
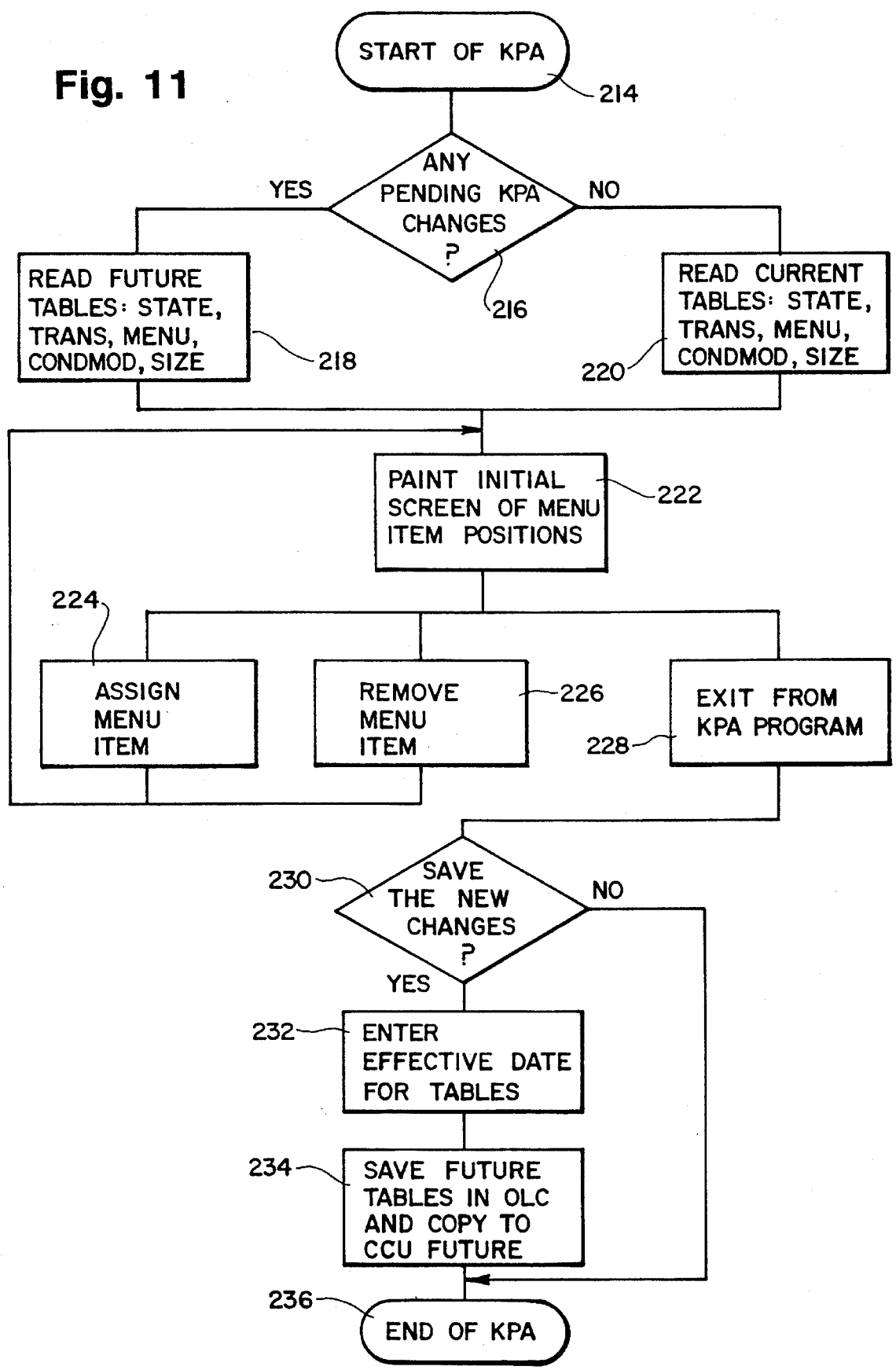
FIG. 11 is a logic flow chart of the Key Position Assignment program executed by the off-line computer.

The KPA Program may be better understood by reference to FIG. 11 which illustrates a logic flow chart of the foregoing functions. The KPA Program begins at block 214. At decision block 216, the KPA Program determines whether there are any pending KPA changes. In the preferred embodiment, new assignments and deletions of items to keys made by the KPA Program may be stored on CCU mass storage device 72, and implemented on an arbitrary future date. Thus, if such changes are pending, control moves to block 218, where the changes are read along with the current key assignments. Current key assignments are also stored on CCU mass storage device 72. If no such changes are pending, control moves to block 220 where the current key assignments are read. In either case, control then moves to block 222, where the ordertaking display screen 116 is displayed. If changes were read in block 218, they will be incorporated into the display screen which is generated by block 222. At block 222, KPA control overlay 132 will also be displayed. If the operator selects key 134, shown in FIG. 9, control moves to block 224 where the Assign Item function, discussed above, is executed. If the operator selects key 136, then control moves to block 226 where the remove menu item function is executed. In either case, control returns to block 222.

If, at block 222, the operator selects key 138, control moves to block 228 where the operator indicates whether the new changes should be saved. Control then moves to decision block 230, where the operator's selection is evaluated. If the operator has indicated that the changes are not to be saved, the KPA Program terminates at block 236. If the operator has indicated that the changes are to be saved, then control moves to block 232 where the operator is prompted for the effective future date when such changes are to be implemented. Control then moves to block 234, where the new assignments are saved on the CCU mass storage device 72 along with the implementation date entered by the operator at block 232. Control then moves to block 236, where the KPA Program terminates.

3. Data and Program Integrity

In the preferred embodiment, data and program integrity are maintained by storing critical application data and programs on CCU mass storage device 72. When FCR 20 is initially powered up, it loads copies of the application data and programs via ILC 26, where they can be executed and/or operated upon by FCR microcomputer 28. The exact contents of the application code and data necessarily depend on the nature of the particular retail environment in which the invention is used.

In order for FCR microcomputer 28 to load the application code and data, FCR microcomputer 28 must be able to read the code and data on CCU mass storage device 72. In the preferred embodiment, this is accomplished by means of the distributed data processing system disclosed in U.S. patent application Ser. No. 07/738,084 (Attorney Docket 25570-10286), filed concurrently with this application and entitled *Distributed Data Processing System and Method Utilizing Peripheral Device Polling And Layered Communication Software* (hereinafter referred to as the "DDP System"). In particular, the present invention makes use of the remote virtual disk ("RVDISK") disclosed by the DDP System. RVDISK enables FCR microcomputer 28 to load upon initialization the file COMMAND.COM (a portion of MS-DOS®), application programs and data, all of which are resident on CCU mass storage device 72. In this manner FCR microcomputer 28 may use SRAM as secondary memory. RVDISK obviates the need for FCR microcomputer 28 to be equipped with a disk drive or removable media mass storage device. Centralized storage of COMMAND.COM, application programs and data on CCU 22 ensures that each FCR 20 will be running the same (and most recent) operating system, application program and data.

In accordance with the present invention, data which is generated by each FCR 20 is written simultaneously to SRAM 56 of FCR 20 and to CCU 22 mass storage device 72. For example, in the preferred embodiment, each FCR 20 tracks total sales since the machine's inception ("Forever Total"), daily sales of each particular salable item (collectively, "Product Mix"), and cash and other consideration received (collectively, "Cash"). The exact information to be tracked depends on the user's particular business needs, and the present invention contemplates that different types of sales data may be tracked in different ways. In the preferred embodiment, Product Mix is an array, list or similar data structure of records, each record being associated with a particular product and containing sales information such as number of units sold, wasted, and given away for promotional purposes. Cash data can also be non-scaler, and can include dollar values of cash, foreign currency, gift certificates and coupons received. Each time a customer's order is rung-up on a particular FCR 20, the data representing Forever Total, Cash and Product Mix are updated in corresponding files contained on both FCR SRAM 56 and CCU mass storage device 72. These files each contain records for storing the data and a file header for storing a transaction number as described below. Suitable data structures for these files are widely known by those skilled in the art and the present invention embraces all such alternatives. FCR microcomputer 28 writes this data to CCU mass storage device 72 by means of ILC 26.

The integrity of the data on FCR SRAM 56 is protected by a reserve power supply 57, as shown in FIG. 2. The reserve power supply 57 is encased inside the FCR SRAM 56 so that its removal results in the physical destruction of some or all of FCR SCRAM 56. In the event external power to FCR 20 is discontinued, the reserve power supply 57, which is electrically connected to FCR SRAM 56, will enable the FCR SRAM 56 to preserve its data. Any attempt to erase the contents of FCR SRAM 56 by discontinuing the FCR's 20 external power supply and removing reserve power supply 57 will be detectable because of the physical alteration of FCR SRAM 56 required to remove reserve power supply 57. In practice, the threat of detection will deter store personnel from tampering with the FCR SRAM 56.

Figure 12:
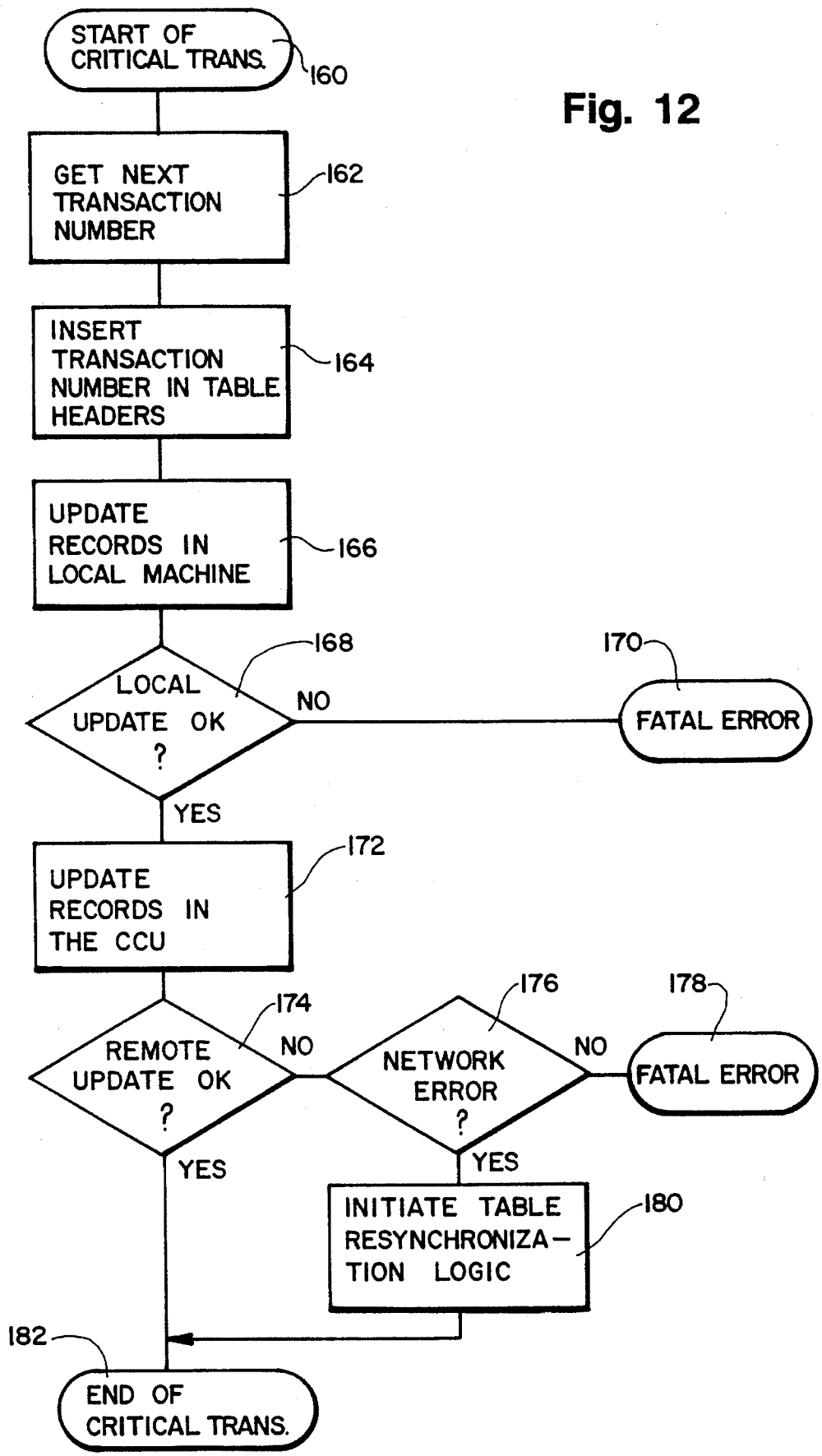
FIG. 12 is a logic flow chart of a system and method of secure delivery of data processing transactions between a POS register and the communication control unit shown in FIG. 1.

The preferred embodiment includes a process for ensuring that data generated by each FCR 20 is securely delivered to CCU 22. FIG. 12 illustrates a logic flow chart of this process. Beginning at block 160, after a customer transaction has been completed at an FCR 20, values of Forever Total, Product Mix and Cash must be updated. Block 162 first generates a transaction number, which is equal to the preceding transaction number plus one, or if there is no preceding transaction number, then simply equal to one. Block 164 then inserts the transaction number into the file header of each file associated with the storage of Forever Total, Product Mix and Cash. Block 166 then updates the file records containing values for Forever Total, Product Mix and Cash in the files contained on FCR SRAM 56. At decision block 168, if the update referred to in block 166 was successful, FCR microcomputer 28 proceeds to block 172. Otherwise, there has been a fatal error, in which case FCR 20 operation terminates at block 170. At block 172, the steps in blocks 164 and 166 are repeated, except that instead of writing data to FCR SRAM 56, the transaction numbers and FCR-generated data are written to CCU mass storage device 72 using inter-processor communications software, and ARCNET network interface, as described above in connection with RVDISK technology. At decision block 174, if the update referred to in block 172 was successful, then the secure delivery process has been successful, and terminates at block 182. Otherwise, control moves to block 176, where the cause of failure is determined. If the failure is not the result of an error or problem with ILC 26, then a fatal error has occurred, and CCU 22 operation is terminated at block 178. If the failure is the result of an error or problem with ILC 26, then control moves to block 180. An example of such an error would be if the cable 106 which connects FCR 20 and CCU 22 is severed.

At block 180, the table resynchronization logic ("TRL") will be initiated upon restoration of ILC 26. The TRL ensures that the records in FCR 20 and CCU 22 are synchronized, and consists of the following steps. First, the transaction numbers in corresponding FCR and CCU file headers are compared. If the transaction numbers are the same, then FCR 20 and CCU 22 records are already synchronized, notwithstanding ILC 26 error. No further action is necessary, and the secure data delivery process terminates at block 182, as shown on FIG. 12. If the transaction number contained in the file header of file on FCR 20 is higher than the transaction number contained in the file header of the corresponding file on CCU 22, then the records of the file contained on CCU 22 are updated with the records of the corresponding file contained on FCR 20. Upon completion of this update, the TRL block 180 terminates, and then the secure data delivery process terminates at block 182.

The foregoing TRL process may be illustrated by an example. Suppose after completion of block 166, the files in FCR SRAM 56 contain data as follows:

| File: | FOREVER TOTAL | PRODUCT MIX | CASH |
|---|---|---|---|
| Contents of File Header: | 999 | 999 | 999 |
| Contents of Records: | $35,303 | 450 | $768 |

Suppose further that after completion of block 172, an ILC error is detected, and at block 180, the files on the CCU mass storage device 72 contain data as follows:

| File: | FOREVER TOTAL | PRODUCT MIX | CASH |
|---|---|---|---|
| Contents of File Header: | 999 | 998 | 998 |
| Contents of Records: | $35,303 | 420 | $752 |

In accordance with the TRL process, the records in the files of Product Mix and Cash on CCU mass storage device 72 would be updated with corresponding records in FCR SRAM 56 because the transaction number in the file headers of the files on FCR SCRAM 56 would be higher than the transaction number associated with the corresponding file headers of the files on CCU mass storage device 72.

The convention of incrementing transaction numbers by one is completely arbitrary. The foregoing process can be achieved by either incrementing or decrementing each successive transaction number. If transaction numbers are decremented, then the logic contained in the TRL must be reversed so that data structures with lower transaction numbers take precedence.

In keeping with the invention, OLC 24 can be operated as CCU 22 in the event that CCU 22 is damaged or disabled. This redundant capability ensures that the Retail System 10 can continue to operate with minimal interruption of service to customers and no loss of backup data.

4. Security

In the preferred embodiment, Retail System 10 includes an access control system based on passwords and identification badges. As shown in FIG. 2, each FCR 20 may have attached to it a badge reader 50. Badge reader 50 is a device which reads data encoded on a strip of magnetic tape which is affixed to the back of cards or badges which are assigned to each operator. In the preferred embodiment, each such badge or card contains a unique number (a "User Number") encoded on its magnetic tape. A data table resident on CCU mass storage device 72 (the "Data Table") tracks which User Number has been assigned to which operator. The Data Table is periodically copied onto the OLC mass storage device 86, where it can be edited. A secret password and a privilege level are also associated with each User Number in the Data Table. Various functions within the Retail System may be assigned a privilege level, with higher numbered privilege levels being assigned to those functions whose access is limited to management personnel.

In the preferred embodiment, an unused component of Retail System 10 such as one of the FCRs 20 or CCU 22 would display an access (or "badge swipe") screen with one or more touch keys 112. An operator using the Retail System gains access to a particular component by touching one of the touch keys 112 displayed on the access screen of the desired component, and then by placing (or "swiping") his or her badge through one of badge readers 50 attached to the Retail System. Badge reader 50 reads the User Number encoded on the badge's magnetic tape. The microcomputer of the selected component then queries the copy of the Data Table resident on CCU 22 via ILC 26. The Data Table indicates the password and privilege level associated with that User Number. The operator then enters his or her password into the selected component, whose microcomputer compares the entered password with the password stored in the Data Table. If the passwords match, the operator is granted access to the system commensurate with the operator's indicated privilege level. If the passwords do not match, or if the privilege level associated with a particular function is higher than the privilege level associated with the operator's User Number, access is denied.

The computer routines necessary to implement the foregoing aspects of the invention will be apparent to those skilled in the art. The routines utilized in the preferred embodiment are described in the logic flow chart shown in FIG. 13. At block 238, the Retail System 10 is powered up. Although not shown in FIG. 13, after power is turned on in step 238, the FCRs 20 are loaded with application programs as described above in connection with data and program integrity At block 240, the Data Table is copied from OLC 24 to CCU 22. At block 242, each FCR 20 is awaiting an operator, continuously displays a badge swipe screen with one or more touch keys 112 until an operator designates one of FCRs 20 onto which he or she desires to log on. This designation can be accomplished by touching one of the keys 112 displayed on the badge swipe screen.

When an operator touches a touch key, the designated FCR 20 instructs the operator to swipe his or her badge through one of badge readers 50 attached to the Retail System 10. As indicated in FIG. 2, one of badge readers 50 can be attached to any one of FCRs 20. Through the ILC 26, an FCR 20 without a badge reader 50 can read a badge reader 50 attached to a different FCR 20. After the user has swiped his or her badge at block 244 through the designated badge reader 50, the designated FCR 20 prompts the operator in block 246 to enter his or her password. Password entry can be accomplished in several ways which will be apparent to those skilled in the art. In the preferred embodiment, the password is entered by means of selecting touch keys displayed on a video monitor in the same manner as described above in connection with Ordertaking Display Screen 116. Alternatively, the password could be entered by a traditional keyboard (not shown) attached to the selected component's microcomputer.

At block 248, the designated FCR 20 looks up the User Number encoded on the operator's badge in the copy of the Data Table resident on CCU 22. At block 250, if the User Number is found in the Data Table, the FCR compares the entered password with the password associated in the Data Table with the User Number. If the passwords are not identical, or if the User Number is not in the Data Table, access is denied, and control returns to block 242. Otherwise control moves to block 252, when the FCR executes the Retail System's 10 application programs, which enable the operator to operate FCR 20 as a POS register. As indicated before, the functions that these application programs perform depend on the specific retail environment in which the invention is practiced. In the preferred embodiment, these functions are accessible via the Ordertaking Display Screen 116 and the function keys 113a through 113n.

Steps 242 through 250 are also implemented in the preferred embodiment on the OLC 24 and the CCU 22, to control access to those devices. Collectively, Steps 242 through 250, when implemented on a computer, operate as an access enabling routine. Returning to FIG. 13, at Block 254, an operator of the FCR 20 (or, as indicated above, CCU 22 or OLC 24) selects a function provided by the application programs. In the preferred embodiment, each of these functions has associated with it a function privilege level. This privilege level can be encoded in the computer routines which implement the function, or can be placed on a data table similar to the Data Table described above. One function which the operator may select is the log off function, which in the preferred embodiment is selected by pressing a touch key. At decision block 256, if the log off function is selected, then control branches to block 242, where the particular FCR 20 (or other component, as the case may be) waits for another operator to log on. If the log off function has not been selected, then control moves to block 258.

At block 258 the privilege level of the selected function is ascertained. The privilege level of each function is predetermined, and can be encoded in the computer routine which implements the function or recorded in a table similar to the Data Table. At block 260 a comparison is made between the privilege level of the selected function and the privilege level related by the Data Table to the User Number. If the user's privilege level is less than the function's privilege level, access to the function is denied and control returns to block 254. If the user's privilege level is greater than or equal to the function's privilege level, then control moves to block 262 where the desired function is performed.

A person skilled in the art will observe that steps 258 and 260, when implemented on a computer, perform as a function enabling routine for controlling access to particular functions. The present invention also contemplates the use of alternative logic in step 260. For example, access could be denied if the user's privilege level is greater than the function's privilege level, so long as the managerial personnel assigning privilege levels understand the logic convention that is actually being employed.

After the desired function has been performed in block 262, control returns to block 254 where the operator may select another function or log off.

Figure 13:
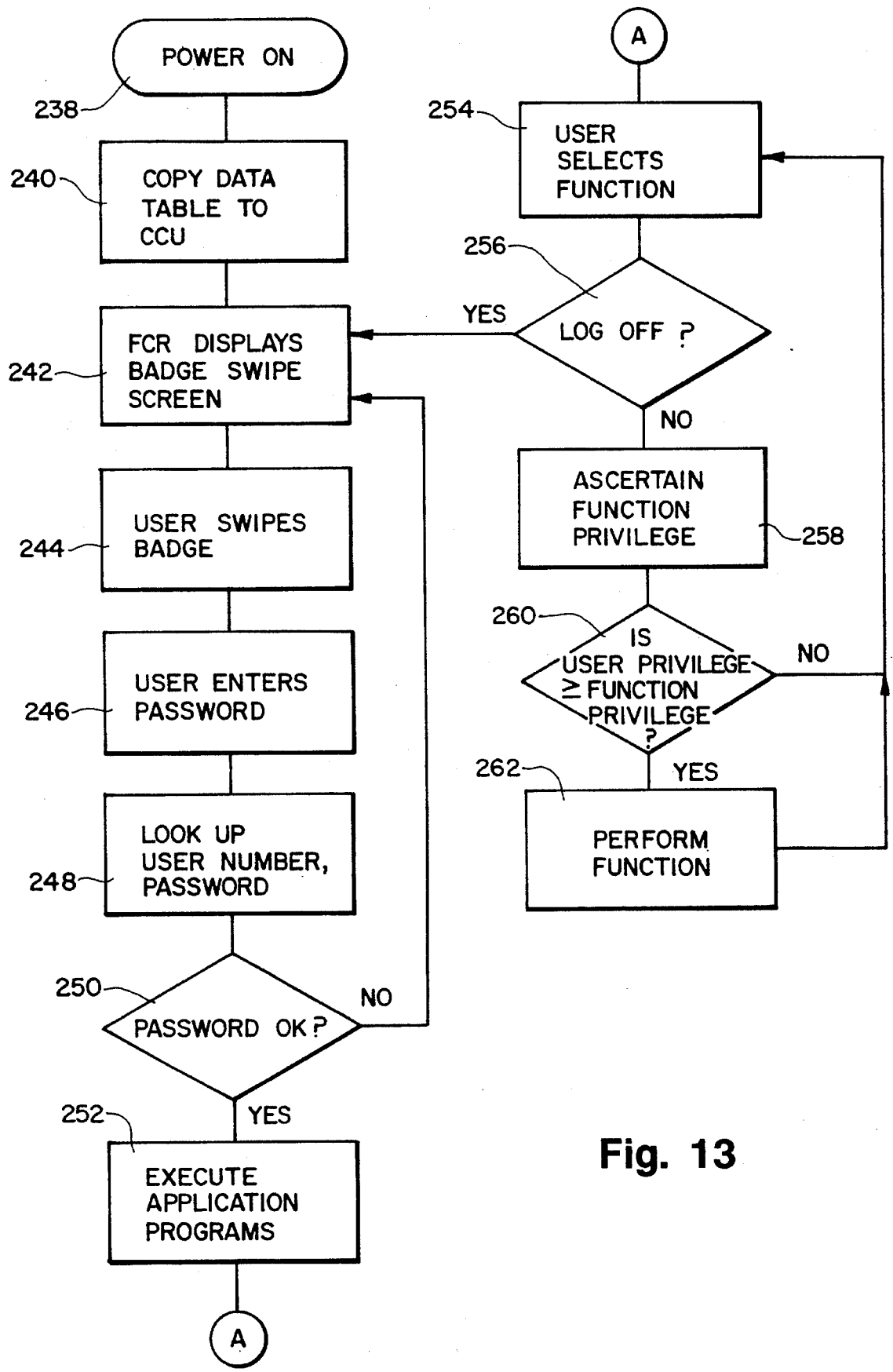
FIG. 13 is a logic flow chart of a system and method for controlling access to the computer system shown in FIG. 1.

Although not illustrated in FIG. 13, a function which is performed by the Retail System 10 is editing of the Data Table. In the preferred embodiment, this editing is done by management personnel on the OLC 24. A typical edit would include adding or deleting a User Number, or changing a privilege level associated with a User Number. An edited Data Table will ultimately be copied onto CCU 22 when Retail System 10 is restarted, typically in the morning of the following business day.

In the preferred embodiment, a variation of the foregoing security system is also provided. Under this variation, one of the functions selectable by a user at block 254 of FIG. 13 is the ability to activate any one of FCRs 20. Preferably, such a function is only available to personnel with a high privilege level. If an FCR 20 is thus activated, it can be operated by a staff person without swiping a badge reader or entering a password. With respect to the flow chart in FIG. 13, a user of an FCR 20 which has been activated in this manner begins operation at block 254. At block 254, such an operator may select any function displayed on Ordertaking Display Screen 116. If the operator selects key 113l (labelled "CRW OUT"), block 256 control returns to block 242. At Block 242, FCR 20 is deactivated. It displays the badge swipe screen and awaits its next user. If the operator selects any other key, control moves directly to block 260. If the selected key is any key other than 113i (labelled "MANAGER"), the function represented by that key is performed, and control returns to block 254. No privilege comparison is made. If the user selects key 113i, then FCR 20 is placed into manager mode, and control moves to block 242. Thereafter, FCR 20 operates in accordance with the security routine as described in FIG. 13.

It will be observed that features of the preferred embodiment described in the preceding section in connection with data integrity also have the effect of securing programs and data which reside on the system. Specifically, as discussed, application programs and data are not physically stored at FCR 20 (other than in the primary memory of FCR microcomputer 28). Furthermore, FCR 20 contains no form of removable mass storage, such as a floppy diskette. Consequently, an FCR operator is unable to copy, remove or alter such application programs and data. Also, an operator of FCR 20 has no practical way to load unauthorized programs or data onto FCR microcomputer 28.

Persons skilled in the art will observe that this arrangement means no data on the FCR SRAM 56 will be altered except pursuant to the authorized application programs provided for the Retail System 10. This arrangement, coupled with the presence of reserve power unit 57, makes it difficult for an operator of FCR 20 to erase or alter data resident on the FCR SRAM 56, such as the Forever Total, except as provided by the application program.

In carrying out the invention, additional security features may be provided as follows:

Drawer Compulsion. In FCR 20, as shown in FIG. 2, touch screen 30 is disabled when cash drawer 38 is opened. If cash drawer 38 remains open for more than a specified period of time, in this case 30 seconds, FCR microcomputer 28 generates an audio alarm and an error message on video monitor 34.

Total Reductions. Every reduction of an order or an item quantity is reported by FCR microcomputer 28. A reduction is defined as the deletion of an item ordered or the reduction in quantity of an item ordered. Reductions are tracked whether they take place before or after an order is totaled. The number of reductions made to an order after it has been totaled is limited by a value set in a table contained in OLC 24. The FCR microcomputer 28 also tracks the total number of reductions and their total dollar value.

Amount Tendered. Cash drawer 38 will not open if the amount tendered (as entered by the operator) is less than the total of the order, including sales tax.

One Cash Drawer. Each FCR 20 may only have one cash drawer 38 attached to it.

OLC Security. The OLC is housed in a secure location to which only management personnel have access.

Off-Line Sales. FCR 20 will not operate unless either CCU 22 or OLC 24 is activated. Therefore, in the preferred embodiment, it is impossible to have off-line sale transactions.

Manager Mode Timeout. When a component of the Retail System, such as an FCR 20 or OLC 24 has been activated by a user with a high privilege level, the microcomputer of the activated component tracks the time elapsed since the operator last touched the touch screen. The activated component is automatically deactivated if such elapsed time exceeds the limit set in a table contained in OLC 24.

5. External Communications

In the illustrated embodiment, as shown FIG. 4, Retail System 10 may be accessed via external communication unit 88. In this manner, a central or other coordinating office can be linked to the OLC 24 for the purpose of loading new application programs or data, or to audit the data and procedures of a particular store. It will be observed that the ability to load application programs by modem, coupled with the invention's use of CCU 22 as a central repository of programs and data, ensures that each POS register throughout a chain of retail stores is running the same version of software. It also enables data generated by each POS register throughout a chain to be accumulated at a central office for management analysis.

6. Software Architecture

The computer system of the present invention may be implemented in a variety of ways depending on the particular environment in which the invention is practiced. In the preferred embodiment, the computer system is built around the communications infrastructure disclosed in U.S. patent application Ser. No. 07/738,084 (Attorney Docket No. 25570-10286), filed concurrently herewith and entitled *Distributed Data Processing System and Method Utilizing Peripheral Device Polling And Layered Communication Software* (the "DDP System").

In accordance with the DDP System, the core of the preferred software implementation is a do-forever processing loop which runs on each of FCRs 20, CCU 22 and OLC 24. The loop processes input from ILC 26 and that one of touch screens 30 and 76 which is attached to the host processor. Preferably programs implementing the functionality described herein are procedures accessible by the do-forever processing loop. A system data base is shared between these procedures. It resides on CCU 22, and is loaded to each FCR 20 by RVDISK, described above. The system data base is organized as a hierarchy of data bases. It contains various partitions for holding queues (discussed below) and the forever total, cash and product mix data discussed above.

The following hierarchy is observed for all information stored in the system data base. The system data base contains tables and queues which comprise records which in turn comprise fields or attributes. Queues are discussed below. With respect to tables, they reside on CCU 22. When Retail System 10 is powered up, the tables are downloaded to each FCR 20, where they are stored in FCR SRAM 56. The tables provide read-only distributed shared memory that makes common system data available to all components. The tables include tables for serving items and condiments and modifiers.

7. Queues

In keeping with the invention, CCU microcomputer 58 maintains a list (or "queue"), preserved on CCU mass storage device 72, of the orders which have been previously entered by each FCR 20. The length of this queue is arbitrary, but in the preferred embodiment it consists of up to twenty-four orders entered on each FCR 20 which is attached to the Retail System 10. By means of ILC 26, as discussed above, each FCR microcomputer 28 can read the contents of the queue of orders associated with the activity of such FCR microcomputer 28. FCR microcomputer 28 can then display such queue on video monitor 34. The operator can view details of or print a specific element of the queue by touching the region of touch screen 30 visually associated with the displayed element in the manner discussed above in connection with Data Entry and Key Position Assignment. Each FCR 20 also maintains a pending order queue of orders taken but not yet served. The queue is maintained on FCR SRAM 56.

Of importance is another queue maintained by the CCU 22, and referred to as the Drive Through Order Queue, or "DTQ"). The DTQ is a list, preferably of no more than fourteen items, of orders taken from a drive through window. The reason the DTQ is maintained is because the drive through order process may involve more than one FCR 20. Preferably, one FRC 20 is used to take drive through orders, a second is used to collect cash or other consideration tendered by the ordering customer, and the third is used to serve the ordered items. Thus, each order is processed by up to three FCRs 20. By maintaining the DTQ on CCU 22, each of FCRs 20 used in the drive through order processes has access to order information. Preferably, when the order is served (at the third FCR 20), the order is removed from the DTQ. In this manner, the DTQ contains drive through orders which have been taken but not yet served.

8. Time Clock Function

In the preferred embodiment, badge reader 50 can also function as a time clock for purposes of computing payroll. As discussed above in connection with security, each operator swipes a badge through badge reader 50 to gain access to Retail System 10. Similarly, each store employee can use the badge reader to record his or her arrival to and departure from work.

In connection with this aspect of the invention, an arriving or departing employee passes his or her badge through badge reader 50. As discussed above, badge reader 50 reads the User Number encoded on the badge's magnetic tape. FCR microcomputer 28 to which the utilized badge reader 50 is attached then records the User Number and the current time on FCR SRAM 56 and on CCU mass storage device 72 via ILC 26, in the manner discussed above in connection with data integrity.

While the invention has been described with respect to certain embodiments, it is to be understood that the invention is capable of numerous changes, modifications and rearrangements without departing from the invention as defined in the following claims.

What is claimed is:

1. A computer system for entering, processing and recording sales of items comprising:

(a) a plurality of physically separated programmable POS register means for entering and tabulating customer orders, said POS register means including programmable display means responsive to a display program for displaying a plurality of keys, each of which is visually associated by the display program with an assigned label which corresponds to at least one salable item, and touch sensitive means for detecting when one of said keys has been touched by a human operator;

(b) off-line processing means, at a location remote from said plurality of programmable POS register means, for programming said programmable POS register means, said off-line processing means including display means for displaying a plurality of keys and a plurality of labels corresponding to at least one salable item, selection means for allowing a human operator to select one of said displayed keys and one of said displayed labels and means responsive to the human operator's selection of one of said displayed keys and one of said displayed labels for revising said plurality of keys and assigned labels displayed on said POS register means without recompiling said display program;

(c) shared memory means, at a location remote from said plurality of programmable POS register means, for recording data entered and tabulated by said programmable POS register means; and (d) communication means for networking said plurality of programmable POS register means, said off-line processing means and said shared memory means.

2. The computer system of claim 1 further comprising access control means for selectively enabling the operation of one of a plurality of functions performed by one of said POS register means, off-line processing means and shared memory means, each of said functions being associated with a predetermined privilege level, if operation of said function on that one of said POS register means, off-line processing means and shared memory means is authorized, comprising:

(a) a plurality of badges each affixed with a magnetic strip electronically encoded with a unique number and each assigned to a particular human operator;

(b) a plurality of badge reader means electronically connected to said communications means for reading said unique numbers on said badges;

(c) means for one of said human operators to designate that one of the plurality of POS register means, shared memory means and off-line processing means that said human operator desires to operate;

(d) password entry means for accepting a password from an operator who has placed one of said badges in said badge reader means;

(e) a table of said unique numbers and relating a predetermined password and privilege level to each of said unique numbers, said table being contained on said shared memory means;

(f) access enabling means for enabling said human operator to use said designated machine if the number encoded on that one of said badges which has been passed through said badge reader is contained in said table, and if said password entered by said human operator matches said predetermined password related by said table to said operator's unique number; and (g) function enabling means for enabling access to a desired function performed by the designated one of said plurality of POS register means, said off-line processing means and said shared memory means if said privilege level related by said table to said operator's unique number is equal to or greater than said predetermined privilege level associated with desired function.

3. The computer system of claim 2 wherein said access control means includes payroll memory means for recording the said unique number and the time at which said badge upon which said unique number is electronically encoded was read by said badge reader, whereby said payroll memory means can record the time which operators arrive at and leave work as a function of the time when said badge is read by said badge reader means.

4. A computer system for entering, processing and recording sales of items comprising:

(a) a plurality of physically separated programmable POS register means comprising programmable display means for displaying a plurality of keys, each of which is visually associated with a label that corresponds to a category of at least one salable item, touch-sensitive means for detecting when one of said keys has been touched by a human operator, and means responsive to said touch-sensitive means for causing said programmable display means to display a plurality of keys, each of which is visually associated with a sub-category of at least one salable item, said sub-category being a member of the category visually associated with that one of said keys most recently touched by the human operator;

(b) off-line processing means, at a location remote from said plurality of programmable POS register means, for creating and modifying programs for said programmable POS register means to display said keys and labels, said off-line processing means including display means for displaying a plurality of keys and a plurality of labels corresponding to at least one salable item, selection means for allowing a human operator to select one of said displayed keys and one of said displayed labels and means responsive to the human operator's selection of one of said displayed keys and one of said displayed labels for revising said plurality of keys and assigned labels displayed on said POS register means without recompiling said display program;

(c) shared memory means, at a location remote from said plurality of programmable POS register means, for recording customer orders entered and tabulated by said programmable POS register means and for storing programs for said programmable POS register means; and (d) communication means for networking said plurality of programmable POS register means, said off-line processing means and said shared memory means, said communications means comprising a plurality of electronically connected network interface units, one of each resident at each said programmable display means, said off-line processing means and said shared memory means.

5. The computer system of claim 4 wherein said programmable display means includes:

(a) a processing means for tabulating entered data and executing programs created or modified by said off-line processing means;

(b) display means responsive to said processing means for displaying a hierarchial menu of a plurality of keys, each of which may be visually associated with a label which corresponds to at least one salable item or category having a plurality of salable items therein;

(c) random access memory means for storing application and operating system programs while being executed by said processing means;

(d) static random access memory means for storing operating system programs and entered data;

(e) software means for interfacing said processor with said communication means; and (f) interface means for interfacing said processor with said touch-sensitive means.

6. The computer system of claim 5 wherein said static random access memory means is physically inaccessible to the operator of said programmable display means, so that said operator is unable to load or remove programs and data to or from said programmable display means and thereby unable to change the contents of said static random access memory means except in accordance with said programs stored on shared memory means.

7. The computer system of claim 6 wherein said static random access memory means include a non-removable reserve power unit, whereby said static random access memory means will continue to hold their contents even if external power to said programmable POS register is disrupted.

8. The computer system of claim 7 including order memory means for continuously recording the N most recent transactions entered into each of said programmable POS register means, where N is an integer greater than one, and order recall means for displaying and printing any of said transactions stored in said order memory means, whereby an operator of said programmable POS register means can review past customer transactions.

9. The computer system of claim 4 wherein said programmable POS register means each comprises:

(a) a microcomputer programmed to display a hierarchial menu of a plurality of keys and labels on a video display, each of said keys being visually associated with one of said labels corresponding to at least one salable item or category having a plurality of salable items therein;

(b) a video monitor on which said microcomputer displays said keys and said labels;

(c) a touch-sensitive screen cooperating with said video monitor and microcomputer to detect which one of said keys has been touched by a human operator so that a human operator may enter a particular salable item or category of salable items into said POS register by touching that one of said keys on said touch-sensitive screen which is visually associated with the label corresponding to that particular salable item or category having a plurality of salable items therein;

(d) a drawer for holding coin and currency electronically connected to said microcomputer whereby said microcomputer can detect when said drawer is opened or closed;

(e) display means for displaying tax and total information computed by said microcomputer, electronically connected to said microcomputer;

(f) a printer electronically connected to said microcomputer;

(g) a total display means for displaying the total and tax for each order entered into said POS register;

(h) a network interface electronically connected to said microcomputer whereby said microcomputer can communicate with said shared memory means and said off-line processing means via said communication means;

(i) software means for enabling said microprocessor to read and write data to or from said shared memory means;

(j) a non-removable, static random access memory means for storing information computed by said microcomputer.

10. The computer system of claim 4 wherein said shared memory means is comprised of:

(a) a microcomputer programmed to display a hierarchial menu of a plurality of keys and labels on a video display, each of said keys being visually associated with one of said labels corresponding to a command which may be performed by said microcomputer;

(b) a video monitor on which said microcomputer displays said keys and said labels;

(c) a touch-sensitive screen cooperating with said video monitor and said microcomputer to detect which one of said keys has been touched by a human operator so that a human operator may enter a particular command into said shared memory means by touching that one of said keys on said touch sensitive-screen which is visually associated with the label corresponding to said particular command;

(d) a printer electronically connected to said microcomputer;

(e) a network interface electronically connected to said microcomputer; and (f) a mass storage device electronically connected to said microcomputer; whereby said shared memory means can store programs and data for use by or generated by said programmable POS register means.

11. The computer system of claim 4 wherein said off-line processing means is comprised of:

(a) a microcomputer programmed to display a hierarchial menu of a plurality of keys and labels on a video display, each of said keys being visually associated with one of said labels corresponding to a command which may be performed by said microcomputer;

(b) a video monitor on which said microcomputer displays said keys and said labels;

(c) a touch-sensitive screen cooperating with said video monitor and microcomputer to detect which one of said keys has been touched by a human operator so that a human operator may enter a particular command into said shared memory means by touching that one of said keys on said touch sensitive screen which is visually associated with the label corresponding to that particular command;

(d) a printer electronically connected to said microcomputer;

(e) a network interface electronically connected to said microcomputer;

(f) a mass storage device electronically connected to said microcomputer;

(g) programming means for modifying programs and data used by said programmable POS register means and contained on said shared memory means, whereby said off-line processor can control the operation of said POS register means; and (h) external communication means for communicating with computer systems physically remote from said off-line computer system.

12. The computer of claim 11 wherein a plurality of badge reader means for reading a magnetic strip affixed to a card or badge are electronically attached to said communications means.

13. A method for networking a microcomputer to a physically separated shared memory device to enable said microcomputer to operate as a point-of-sale register and to ensure the integrity of sales data generated by said microcomputer, comprised of the following steps:

(a) connecting said microcomputer and said shared memory device with a computer network;

(b) storing an original copy of transaction data generated by said microcomputer on a memory device connected to said microcomputer;

(c) storing a duplicate copy of said transaction data on a memory device connected to said shared memory device;

(d) associating a sequentially generated transaction number with each successive set of said original and said duplicate copies of said transaction data, whereby the most recently generated copies have the highest transaction number;

(e) comparing said transaction numbers associated with the most recently generated of said original and said duplicate copies of said transaction data to determine if said transaction numbers are identical, whereby the presence of identical transaction numbers on said original and said duplicate copies of said transaction data ensures that said microcomputer and said shared memory device have correct and current copy of said transaction data.

14. The method of claim 13 comprised of the following additional steps:

(a) replacing said original copy of transaction data with said duplicate copy if said duplicate copy is associated with a higher transaction number;

(b) replacing said duplicate copy of transaction data with said original copy of transaction data if said duplicate copy is associated with a higher transaction number.

15. A method for networking a microcomputer to a physically separated shared memory device to enable said microcomputer to operate as a point-of-sale register and to ensure the integrity of sales data generated by said microcomputer, comprised of the following steps:

(a) storing programs and data necessary to enable said microcomputer to function as a POS register on a shared memory device, physically separated from said microcomputer;

(b) electronically connecting said microcomputer with said shared memory device;

(c) creating a plurality of data structures in said microcomputer's memory for storing cumulatively tabulated sales data in said microcomputer's memory, said data structures each comprising data records containing the tabulated data and a header containing a transaction number;

(d) creating a plurality of backup data structures in said shared memory means which are duplicative of said data structures in said microcomputer's memory, so that for each data structure in said microcomputer's memory, there is a corresponding backup data structure in said shared memory means;

(e) entering sales from a specific customer transaction into said microcomputer;

(f) tabulating sales data for each customer transaction entered into said microcomputer;

(g) generating said transaction number, said transaction number greater than the previous transaction number;

(h) placing said transaction number in said header of each said data structure;

(i) updating said data structures by placing said tabulated data in said data records;

(j) determining if steps (g) through (i) have been successfully completed, and aborting the operation of said microprocessor where steps (g) through (i) have not been successfully completed;

(k) updating each of said backup data structures by placing into said data records of particular one of said backup data structures said tabulated data contained in that one of said plurality of data structures which corresponds to said particular backup data structure, and placing said transaction number generated in step (g) in said header of said particular backup data structure;

(l) determining if step (k) was successfully completed, and if step (k) was successfully completed, then skipping to step (p);

(m) determining if the failure of step (k) was due to a failure of said networking means, and aborting the operation of said shared memory means if failure of step (k) was due to a reason other than a failure of said networking means;

(n) waiting until said networking means have been made operational;

(o) examining each said data structure and said backup data structure to determine whether any of said data structure has a higher transaction number than any said corresponding backup data structure; and (p) updating the contents of said backup data with the contents of said corresponding data structure if said data structure contains a higher transaction number than said corresponding backup data structure.

16. The method of claim 15 wherein the following steps are included after step (d):

(a) updating the contents of said data records and said header of each particular one of said data structures with the contents of said data records and said header, respectively, of said corresponding backup data structure if said corresponding backup data structure contains a higher transaction number than said particular data structure;

(b) updating the contents of said data records and said header of each particular one of said backup data structures with the contents of said data records and said header, respectively, of said corresponding data structure if said corresponding data structure contains a higher transaction number than said particular backup data structure;

17. The method of claim 15 wherein steps (e) through (p) are repeated for each successive customer transaction.

18. A computer system for entering, processing and recording sales of items comprising:

(a) a plurality of physically separated programmable POS register means comprised of programmable display means for displaying a plurality of keys, each of which is visually associated with a label that corresponds to a category of at least one salable item, touch-sensitive means for detecting when one of said keys has been touched by a human operator, and means responsive to said touch-sensitive means for causing said programmable display means to display a plurality of keys, each of which is visually associated with a sub-category of at least one salable item, said sub-category being a member of the category visually associated with that one of said keys most recently touched by said human operator;

(b) off-line processing means, at a location remote from said plurality of programmable POS register means, for creating and modifying programs for said programmable POS register means to display said keys and labels, whereby the operator of said off-line processing means may assign one or more of said keys to a label corresponding to at least one salable item or a category having a plurality of salable items therein;

(c) shared memory means, at a location remote from said plurality of programmable POS register means, for recording customer orders entered and tabulated by said programmable POS register means and for storing programs for said programmable POS register means; and (d) communications means for networking said plurality of programmable POS register means, said off-line processing means and said shared memory means, said communications means comprised of a plurality of electronically connected network interface units, one of each resident at each said programmable display means, said off-line processing means and said shared memory means; and (e) access control means for selectively enabling the operation of one of a plurality of functions performed by one of said POS register means, off-line processing means and shared memory means, each of said functions being associated with a predetermined privilege level, if operation of said function on that one of said POS register means, off-line processing means and shared memory means is authorized comprising of:

a plurality of badges each affixed with a magnetic strip electronically encoded with a unique number and each assigned to a particular human operator;

a plurality of badge reader means electronically connected to said communications means for reading said unique numbers on said badges;

means for one of said human operators to designate that one of the plurality of POS register means, shared memory means and off-line processing means which said human operator desires to operate;

password entry means for accepting a password from an operator who has placed one of said badges in said badge reader means;

a table of said unique numbers and relating a predetermined password and privilege level to each of said unique numbers, said table being on said shared memory means;

access enabling means for enabling said human operator to use said designated machine if the number encoded on that one of said badges which has been passed through said badge reader is contained in said table, and if said password entered by said human operator matches said predetermined password related by said table to said operator's unique number;

function enabling means for enabling access to a desired function performed by the designated one of said plurality of POS register means, said off-line processing means and said shared memory means if said privilege level related by said table to said operator's unique number is equal to or greater than said predetermined privilege level associated with desired function.

19. The computer system of claim 18 wherein said access control means includes payroll memory means for recording the said unique number and the time at which said badge upon which said unique number is electronically encoded was passed through said badge reader, whereby said payroll memory means can record the time which operators arrive at and depart work as a function of the times when said badge is read by said badge reader means corresponding to the arrival and departure times of each operator.

* * * * *